(12) United States Patent
Hapsari et al.

(10) Patent No.: US 9,596,627 B2
(45) Date of Patent: Mar. 14, 2017

(54) MOBILE COMMUNICATION METHOD AND MOBILE STATION

(71) Applicant: NTT DOCOMO, INC., Tokyo (JP)

(72) Inventors: Wuri Andarmawanti Hapsari, Tokyo (JP); Yasufumi Morioka, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 6 days.

(21) Appl. No.: 14/421,226

(22) PCT Filed: Aug. 8, 2013

(86) PCT No.: PCT/JP2013/071503
§ 371 (c)(1),
(2) Date: Feb. 12, 2015

(87) PCT Pub. No.: WO2014/027604
PCT Pub. Date: Feb. 20, 2014

(65) Prior Publication Data
US 2015/0245254 A1    Aug. 27, 2015

(30) Foreign Application Priority Data
Aug. 14, 2012    (JP) ................................. 2012-179812

(51) Int. Cl.
*H04W 36/00* (2009.01)
*H04W 76/04* (2009.01)
(Continued)

(52) U.S. Cl.
CPC ....... *H04W 36/0027* (2013.01); *H04W 16/32* (2013.01); *H04W 24/10* (2013.01); *H04W 36/30* (2013.01); *H04W 76/04* (2013.01); *H04W 76/041* (2013.01); *H04W 76/046* (2013.01); *H04W 36/04* (2013.01); *H04W 88/02* (2013.01);
(Continued)

(58) Field of Classification Search
USPC ........................................................ 455/436
See application file for complete search history.

(56) References Cited

U.S. PATENT DOCUMENTS

2012/0044860 A1    2/2012    Takahashi et al.
2012/0170508 A1    7/2012    Sawai

FOREIGN PATENT DOCUMENTS

JP    2011-91783 A    5/2011

OTHER PUBLICATIONS

Office Action issued in corresponding Japanese Application No. 2012-179812 mailed Sep. 8, 2015 (18 pages).
(Continued)

*Primary Examiner* — Joel Ajayi
(74) *Attorney, Agent, or Firm* — Osha Liang LLP

(57) ABSTRACT

In a mobile communication method of the invention, when communication of a mobile station (UE) in a "RRC_Connected state" in a cell (#1) under the control of a radio base station (eNB#1) is performed through an EPS bearer formed of a U-plane bearer between the mobile station (UE) and the radio base station (eNB#1) and an S1-U bearer between the radio base station (eNB#1) and a gateway device (S-GW), and if the radio base station (eNB#1) detects that a cell (#10) is located around the mobile station (UE), the radio base station (eNB#1) sends the mobile station (UE) "RRC Connection Reconfiguration" which contains information correlating identification information on the EPS bearer with identification information on the cell (#10).

7 Claims, 10 Drawing Sheets

(51) Int. Cl.
H04W 16/32 (2009.01)
H04W 24/10 (2009.01)
H04W 36/30 (2009.01)
H04W 36/04 (2009.01)
H04W 92/20 (2009.01)
H04W 88/02 (2009.01)
H04W 88/08 (2009.01)
H04W 88/16 (2009.01)

(52) U.S. Cl.
CPC ............ *H04W 88/08* (2013.01); *H04W 88/16* (2013.01); *H04W 92/20* (2013.01)

(56) References Cited

OTHER PUBLICATIONS

Extended European Search Report in counterpart European Application No. 13 879 544.8 issued Mar. 2, 2016 (11 pages).
N. Fuke, et al.; "End-to-end QoS Control Scheme employing IEEE802.21 in Handover between Direct/Relayed Connections," IEICE Technical Report NS2007-44; Jul. 12, 2007 (20 pages).
Written Opinion for corresponding International Application No. PCT/JP2013/071503, mailed Sep. 10, 2013 (4 pages).
International Search Report for corresponding International Application No. PCT/JP2013/071503, mailed Sep. 10, 2013 (2 pages).
NTT DOCOMO, Inc.; "Requirements, Candidate Solutions & Technology Roadmap for LTE Rel-12 Onward;" 3GPP Workshop on Release 12 and onwards, RWS-120010; Ljubljana, Slovenia; Jun. 11-12, 2012 (27 pages).
Media Tek Inc.; "TP for PRACH configuration of SCell in sTAG;" 3GPP TSG-RAN2 #78 Meeting, R2-122231; Prague, Czech; May 21-25, 2012 (6 pages).

FIG. 5

E-RAB Setup Request for eLA

| IE/Group Name | Presence | Range | IE type and reference | Semantics description | Criticality | Assigned Criticality |
|---|---|---|---|---|---|---|
| Message Type | M | | | | YES | reject |
| m-eNB UE XPhAP ID | M | | | | YES | reject |
| UE Aggregate Maximum Bit Rate | O | | | | YES | reject |
| E-RAB to be Setup List | | 1 | | | YES | reject |
| >E-RAB To Be Setup Item IEs | | 1 to <maxnoof E-RABs> | | | EACH | reject |
| >>E-RAB ID | M | | | | – | |
| >>E-RAB Level QoS Parameters | M | | | Includes necessary QoS parameters | – | |
| >>Transport Layer Address | M | | | IP address on Macro eNB side | – | |
| >>GTP-TEID | M | | | TEID of Macro eNB | – | |
| >>RRCContext | | | | Include the PDCP Config, RLC Config, MAC Main Config, logicalChann elIdentity, logicalChann elConfig as defined in 36.331 for each bearer | | |

| Range bound | Explanation |
|---|---|
| maxnoofE-RABs | Maximum no. of E-RAB allowed towards one UE, the maximum value is 256. |

FIG. 6

E-RAB Setup Response for eLA

| IE/Group Name | Presence | Range | IE type and reference | Semantics description | Criticality | Assigned Criticality |
|---|---|---|---|---|---|---|
| Message Type | M | | | | YES | reject |
| M-eNB UE XPhAP ID | M | | | | YES | ignore |
| Ph-eNB UE XPhAP ID | M | | | | YES | ignore |
| E-RAB Setup List | | 0..1 | | | YES | ignore |
| >E-RAB Setup Item Ies | | 1 to <maxnoof E-RABs> | | | EACH | ignore |
| >>E-RAB ID | M | | | | – | |
| >>Transport Layer Address | M | | | IP address on Phantom eNB side | – | |
| >>GTP-TEID | M | | | TEID on Phantom eNB side | – | |
| E-RAB Failed to Setup List | O | | | a value for E-RAB ID shall only be present once in E-RAB Setup List IE + in E-RAB Failed to Setup List IE | YES | ignore |
| Criticality Diagnostics | O | | | | YES | ignore |

| Range bound | Explanation |
|---|---|
| maxnoofE-RABs | Maximum no. of E-RAB allowed towards one UE, the maximum value is 256. |

FIG. 7

*RRCConnectionReconfiguration message*

```
-- ASN1START

RRCConnectionReconfiguration ::=     SEQUENCE {
    rrc-TransactionIdentifier        RRC-TransactionIdentifier,
    criticalExtensions               CHOICE    {
        c1                                    CHOICE{
            rrcConnectionReconfiguration-r8       RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture         SEQUENCE {}
    }
}

RRCConnectionReconfiguration-r8-IEs ::=    SEQUENCE {
    measConfig                        MeasConfig                    OPTIONAL,    -- Need ON
    mobilityControlInfo               MobilityControlInfo           OPTIONAL,    -- Cond HO
    dedicatedInfoNASList              SEQUENCE (SIZE(1..maxDRB)) OF
                                          DedicatedInfoNAS          OPTIONAL,    -- Cond nonHO
    radioResourceConfigDedicated      RadioResourceConfigDedicated  OPTIONAL,    -- Cond HO-toEUTRA
    securityConfigHO                  SecurityConfigHO              OPTIONAL,    -- Cond HO
    nonCriticalExtension              RRCConnectionReconfiguration-v890-IEs    OPTIONAL
}

RRCConnectionReconfiguration-v890-IEs ::= SEQUENCE {
    lateNonCriticalExtension          OCTET STRING                  OPTIONAL,    -- Need OP
    nonCriticalExtension              RRCConnectionReconfiguration-v920-IEs     OPTIONAL
}

RRCConnectionReconfiguration-v920-IEs ::= SEQUENCE {
    otherConfig-r9                    OtherConfig-r9                OPTIONAL,    -- Need ON
    fullConfig-r9                     ENUMERATED {true}             OPTIONAL,    -- Cond HO-Reestab
    nonCriticalExtension              RRCConnectionReconfiguration-v1020-IEs    OPTIONAL
}

RRCConnectionReconfiguration-v1020-IEs ::= SEQUENCE {
    sCellToReleaseList-r10            SCellToReleaseList-r10        OPTIONAL,    -- Need ON
    sCellToAddModList-r10             SCellToAddModList-r10         OPTIONAL,    -- Need ON
    nonCriticalExtension              RRCConnectionReconfiguration-v1100
                                                                    OPTIONAL
}

RRCConnectionRecofiguration-v1100-IEs ::= SEQUENCE {
    smallCellToAddModList-r11         SmallCellToAddModList-r11     OPTIONAL,
    smallCellToReleaseList-r11        SmallCellToRelease-r11        OPTIONAL,
    nonCriticalExtention              SEQUENCE {} OPTIONAL - Need OP
}

SmallCellToAddModList-r11 ::=    SEQUENCE (SIZE (1..maxSmallCell-r11))   OF SmallCellToAddMod-r11

SmallCellToAddMod-r11 ::=       SEQUENCE {
    smallCellIdentificationList-r11    SEQUENCE (SIZE (1..maxSmallCellCA)) OF SmallCellId-r11
    OPTIONAL,
    smallCellRadioResourceConfigDedicated-r11          RadioResourceConfigDedicatedSmallCell-r11
    OPTIONAL,
    ...
}

SmallCellToReleaseList-r11 ::=    SEQUENCE (SIZE (1..maxSmallCell-rell)) OF SmallCellId SmallCellId ::= SEQUENCE   [
    smallCellId-r11        PhantomCellId,
    dl-CarrierFreq-r11     ARFCN-ValueEUTRA
]

-- ASN1STOP
```

FIG. 8

*RadioResourceConfigDedicated* information element

```
-- ASN1STA RT

RadioResourceConfigDedicated    ::=      SEQUENCE {
    srb-ToAddModList                     SRB-ToAddModList           OPTIONAL,       -- Cond HO-Conn
    drb-ToAddModList                     DRB-ToAddModList           OPTIONAL,       -- Cond HO-
toEUTRA
    drb-ToReleaseList                    DRB-ToReleaseList          OPTIONAL,       -- Need ON
    mac-MainConfig                       CHOICE {
        explicitValue                        MAC-MainConfig,
        defaultValue                         NULL
    }       OPTIONAL,                                                               -- Cond HO-
toEUTRA2
    sps-Config                           SPS-Config                 OPTIONAL,       -- Need ON
    physicalConfigDedicated              PhysicalConfigDedicated    OPTIONAL,       -- Need ON
    ...,
    [[  rlf-TimersAndConstants-r9        RLF-TimersAndConstants-r9         OPTIONAL    -- Need ON
    ]],
    [[  measSubframePatternPCell-r10     MeasSubframePatternPCell-r10      OPTIONAL    -- Need ON
    ]]
}

RadioResourceConfigDedicatedSCell-r10 ::  =    SEQUENCE {
    -- UE specificconfigurationextensions applicable for an SCell
    physicalConfigDedicatedSCell- r10            PhysicalConfigDedicatedSCell-r10   OPTIONAL,   -- Need
ON
    ...
}

SmallCellRadioResourceConfigDedicated-r11    ::= SEQUENCE {
    drb-ToAddModSmallCellList            DRB- ToAddModSmallCellList,
    ...
}

SRB-ToAddModList : :=                SEQUENCE (SIZE (1..2)) OF SRB-ToAddMod

SRB-ToAddMod ::=        SEQUENCE {
    srb-Identity                         INTEGER (1..2),
    rlc-Config                           CHOICE {
        explicitValue                        RLC-Config,
        defaultValue                         NULL
    }       OPTIONAL,                                                               -- Cond Setup
    logicalChannelConfig                 CHOICE {
        explicitValue                        LogicalChannelConfig,
        defaultValue                         NULL
    }       OPTIONAL,                                                               -- Cond Setup
    ...
}

DRB-ToAddModList : :=                SEQUENCE (SIZE (1..maxDRB)) OF DRB-ToAddMod DRB-ToAddMod ::=        SEQUENCE {
    eps-BearerIdentity                   INTEGER (0..15)            OPTIONAL,       -- Cond DRB-Setup
    drb-Identity                         DRB-Identity,
    pdcp-Config                          PDCP-Config                OPTIONAL,       -- Cond PDCP
    rlc-Config                           RLC-Config                 OPTIONAL,       -- Cond Setup
    logicalChannelIdentity               INTEGER (3..10)            OPTIONAL,       -- Cond DRB-Setup
    logicalChannelConfig                 LogicalChannelConfig       OPTIONAL,       -- Cond Setup
    ...
}

DRB-ToAddModSmallCellList    ::=    SEQUENCE (SIZE (1..maxDRB)) OF DRB-ToAddModSmallCell DRB-ToAddModSmallCell    ::= SEQUENCE {
    eps-BearerIdentity                   INTEGER (0..15)            OPTIONAL,
    ...
}

DRB-ToReleaseList   ::=              SEQUENCE (SIZE (1..maxDRB)) OF DRB-Identity MeasSubframePatternPCell-r10   ::=   CHOICE {
    release                              NULL,
    setup                                MeasSubframePattern-r10
}

-- ASN1STOP
```

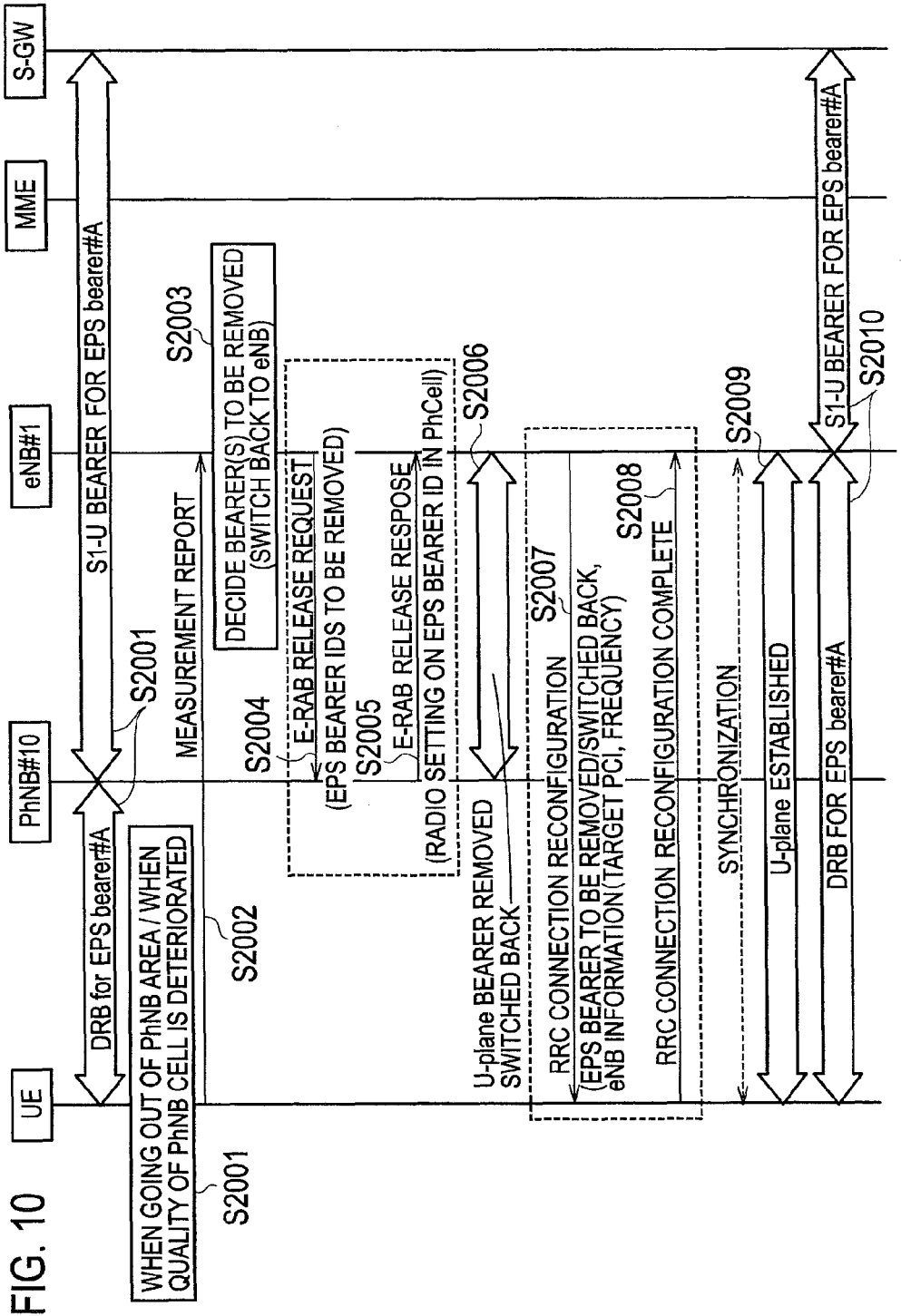

MOBILE COMMUNICATION METHOD AND MOBILE STATION

TECHNICAL FIELD

The present invention relates to a mobile communication method and a mobile station.

BACKGROUND ART

In LTE (Long Term Evolution), "eLA (enhanced local area) architecture" for splitting a C-plane bearer and a U-plane bearer is under study in order to realize load distribution as well as an increase in system capacity by using a small cell or a phantom cell while covering "connectivity" and "mobility" by using a macro cell.

PRIOR ART DOCUMENT

Non-Patent Document

Non-patent document 1: 3GPP RWS-120010, "Requirements, Candidate Solution & Technology Roadmap for LTE Rel-12 Onward," NTT DOCOMO, INC

SUMMARY OF THE INVENTION

A possible requirement for realizing the "eLA architecture" in LTE is to minimize an impact on a core network.

However, in LTE, any concrete architecture for satisfying this requirement is yet to be studied.

The present invention has been made in view of the above-mentioned problem. An objective of the present invention is to provide a mobile communication method and a mobile station, which are capable of realizing optimum architecture from the viewpoint of "connectivity" and "mobility" as well as the viewpoint of an increase in system capacity and of load distribution, while minimizing an impact on a core network.

A first feature of the present invention is summarized as a mobile communication method including: a step A of, when communication of a mobile station in a connected state in a first cell under control of a first radio station is performed through a radio access bearer formed of a data radio bearer between the mobile station and the first radio base station and a bearer between the first radio base station and a gateway device, and if a second cell under control of a second radio base station is located in a coverage of the first cell and the first radio base station detects that the second cell is located around the mobile station from a result of a radio measurement on the mobile station, causing the first radio base station to send the mobile station a setting change signal containing information correlating identification information on the radio access bearer with identification information on the second cell; a step B of causing the mobile station to set a data radio bearer between the mobile station and the second radio base station in response to the setting change signal; and a step C of changing the radio access bearer so that the radio access bearer is formed of the data radio bearer between the mobile station and the second radio base station, a bearer between the second radio base station and the first radio base station, and the bearer between the first radio base station and the gateway device.

A second feature of the present invention is summarized as a mobile station. Here, the mobile station is configured such that when the mobile station is in a connected state in a first cell under control of a first radio station and performs communication through a radio access bearer formed of a data radio bearer between the mobile station and the first radio base station and a bearer between the first radio base station and a gateway device, and if the mobile station receives a setting change signal from the first radio base station, the setting change signal containing information correlating identification information on the radio access bearer with identification information on a second cell under control of a second radio base station, the second cell being located in a coverage of the first cell, the mobile station sets a data radio bearer between the mobile station and the second radio base station in response to the setting change signal, and changes the radio access bearer so that the radio access bearer is formed of the data radio bearer between the mobile station and the second radio base station, a bearer between the second radio base station and the first radio base station, and the bearer between the first radio base station and the gateway device.

BRIEF DESCRIPTION OF THE DRAWINGS

FIG. 5 is a chart showing an example of "E-RAB Setup Request For eLA" to be transmitted in the mobile communication system according to the first embodiment of the present invention.

FIG. 6 is a chart showing an example of "E-RAB Setup Response For eLA" to be transmitted in the mobile communication system according to the first embodiment of the present invention.

FIG. 7 is a diagram showing an example of "RRC Connection Reconfiguration" to be transmitted in the mobile communication system according to the first embodiment of the present invention.

FIG. 8 is a diagram showing an example of an information element "RadioResourceConfigDedicated" in the "RRC Connection Reconfiguration" to be transmitted in the mobile communication system according to the first embodiment of the present invention.

FIG. 10 is a sequence diagram showing an operation of the mobile communication system according to the first embodiment of the present invention.

MODE FOR CARRYING OUT THE INVENTION

Mobile Communication System of First Embodiment of Present Invention

A mobile communication system according to a first embodiment of the present invention is described with reference to FIG. 1 to FIG. 10.

Figure 1:
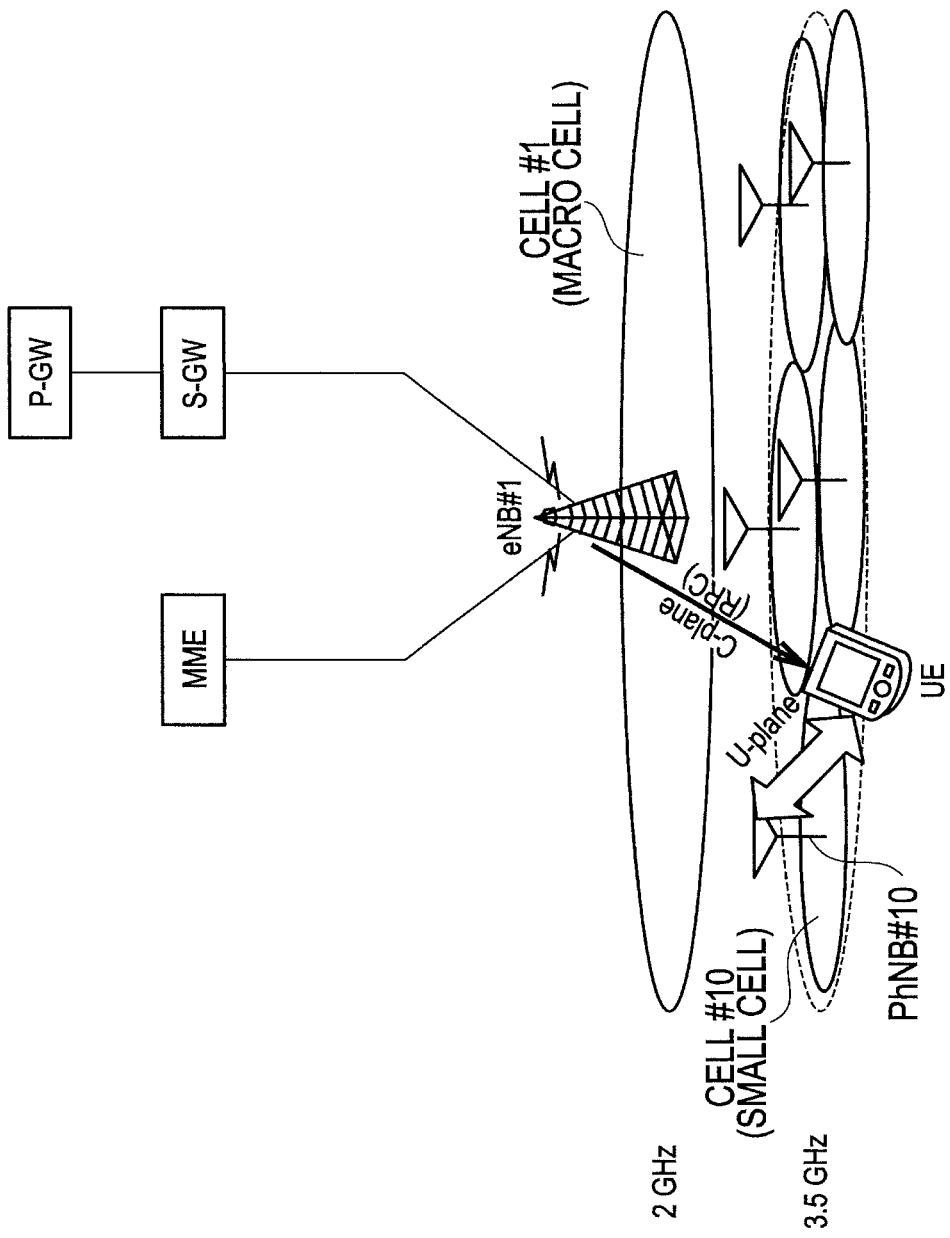
FIG. 1 is an overall configuration diagram of a mobile communication system according to a first embodiment of the present invention.

As shown in FIG. 1, the mobile communication system of this embodiment is an LTE mobile communication system which includes gateway devices P-GW and S-GW, a mobility management node MME (mobility management entity), a radio base station eNB#1 that manages a cell #1, and a radio base station PhNB#10 that manages a cell #10.

Here, in the example of FIG. 1, the cell #1 is a macro cell (a serving cell for a mobile station UE) and the cell #10 is a small cell (a phantom cell). Moreover, the cell #10 is assumed to be located in a coverage area of the cell #1.

The mobile communication system of this embodiment is configured to be capable of adopting "eLA architecture." As shown in FIG. 1, the mobile communication system is configured to be capable of setting a U-plane bearer for the mobile station UE between the mobile station UE and the radio base station PhNB#10, and setting a C-plane bearer for the mobile station UE between the mobile station UE and the radio base station eNB#1.

Figure 2:
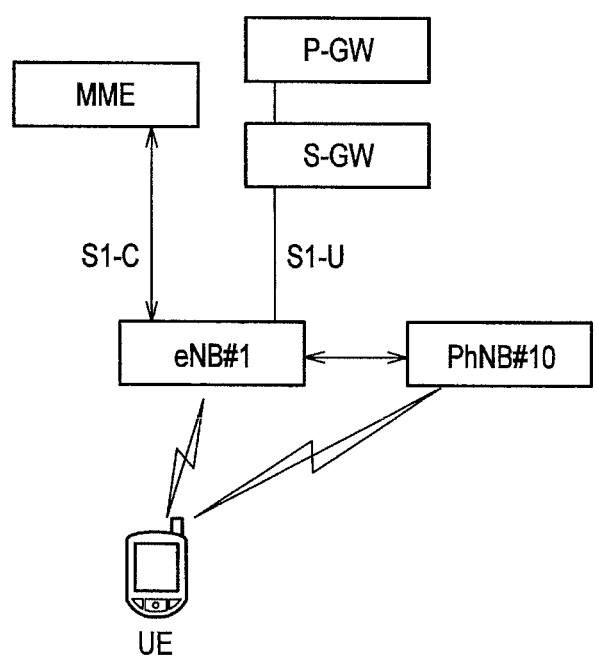
FIG. 2 is a schematic diagram of the overall configuration of the mobile communication system according to the first embodiment of the present invention.
Figure 3:
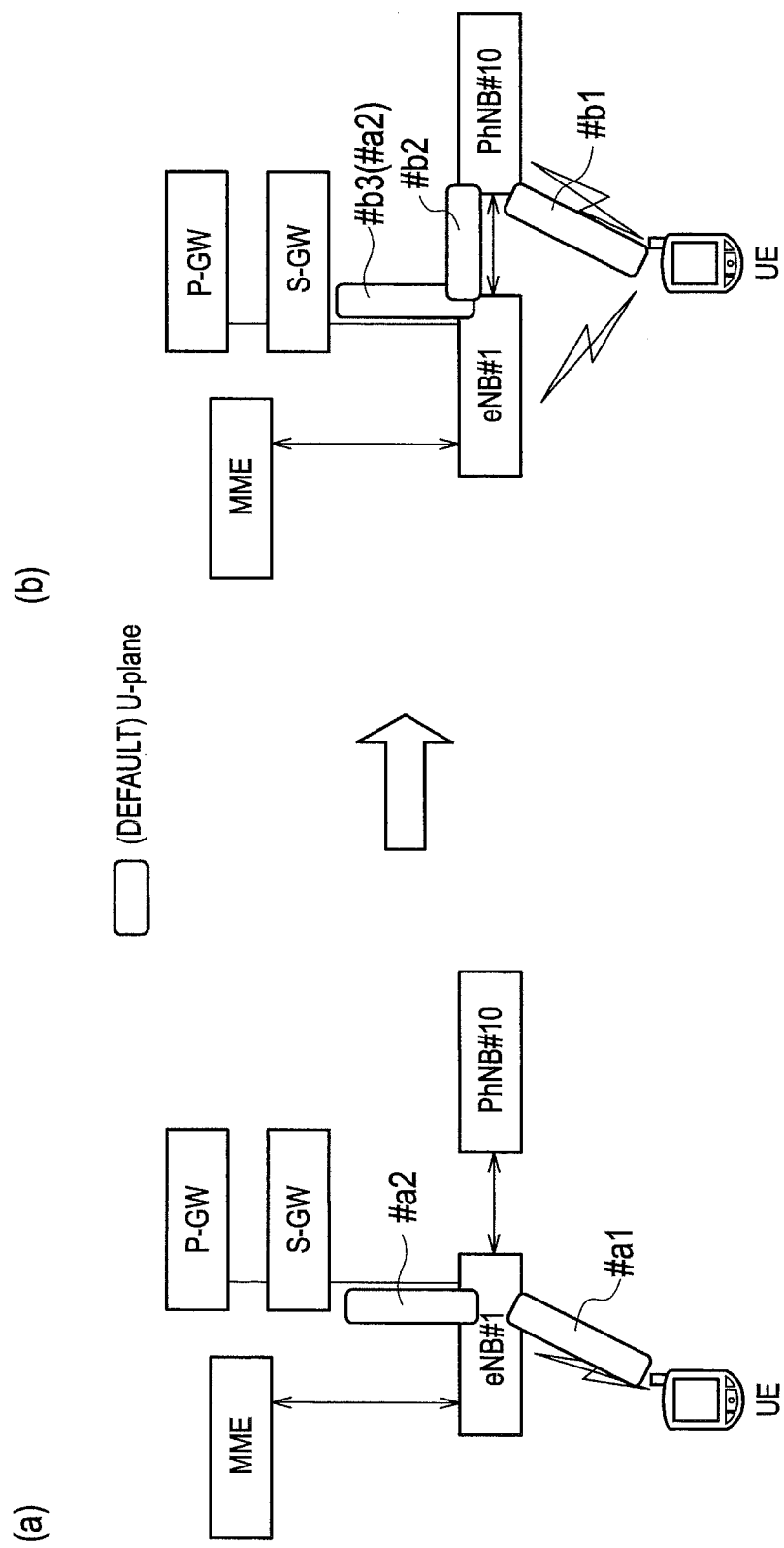
FIG. 3 shows configuration diagrams of U-plane bearers in the mobile communication system according to the first embodiment of the present invention.

As shown in FIG. 2, an S1-C (S1-MME) interface is designed to exist only between the mobility management node MME and the radio base station eNB#1.

Accordingly, the mobility management node MME cannot recognize the radio base station PhNB#10. In other words, the mobility management node MME is configured to regard the cell #10 under control of the radio base station PhNB#10 as one of cells under control of the radio base station eNB#1.

Meanwhile, an S1-U interface is designed to exist only between the gateway device S-GW and the radio base station eNB#1.

Each of the radio base station eNB#1 and the radio base station PhNB is independently provided with a PDCP (packet data convergence protocol) layer function, an RLC (radio link control) layer function, and an MAC (media access control) layer function.

Here, the PDCP layer function, the RLC layer function, and the MAC layer function of the radio base station eNB#1 can be terminated independently of a PDCP layer function, an RLC layer function, and an MAC layer function of the mobile station UE.

Note that the radio base station eNB#1 includes an RRC (radio resource control) layer function and is capable of communicating with the mobile station UE in a terminating fashion. On the other hand, the mobile base station PhNB does not have the RRC layer function and therefore does not communicate with the mobile station UE in a terminating fashion.

Here, as shown in FIG. 3(a), in the case where communication of the mobile station UE in "RRC_Connected state" is carried out through an EPS bearer formed of a U-plane bearer #a1 and an S1-U bearer #a2 in the cell #1 under the control of the radio base station eNB#1 in the mobile communication system of this embodiment, and if the cell #10 under the control of the radio base station PhNB#10 is located in the coverage of the cell #1 and the cell #10 is detected as being located around the mobile station UE from a result of a radio measurement on the mobile station UE as shown in FIG. 3(b), the communication of the mobile station UE is carried out through an EPS bearer formed of a U-plane bearer #b1, an S1-U bearer #b2, and an S1-U bearer #b3 (#a2) thereafter.

Here, the U-plane bearer #a1 is set between the mobile station UE and the radio base station eNB#1, and the S1-U bearer #a2 is set between the radio base station eNB#1 and the gateway device S-GW.

Meanwhile, the U-plane bearer #b1 is set between the mobile station UE and the radio base station PhNB#10, the S1-U bearer #b2 is set between the radio base station eNB#1 and the radio base station PhNB#10, and the S1-U bearer #b3 is set between the radio base station eNB#1 and the gateway device S-GW.

Here, when the cell #10 is removed (for example, when the mobile station UE moves out of a coverage area of the cell #10) in the state shown in FIG. 3(b), the communication of the mobile station UE is carried out through the EPS bearer formed of the U-plane bearer #a1 and the S1-U bearer #a2 thereafter.

Figure 4:
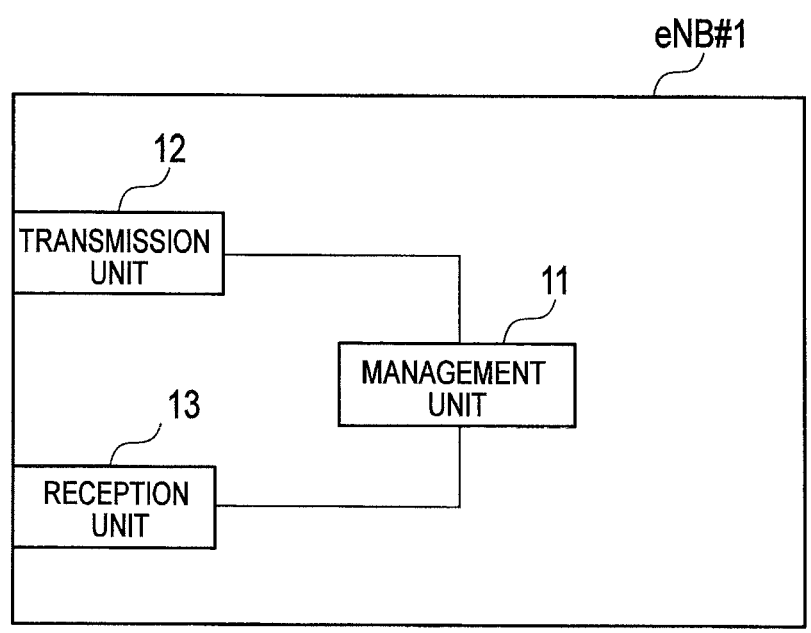
FIG. 4 is a functional block diagram of a radio base station according to the first embodiment of the present invention.

As shown in FIG. 4, the radio base station eNB#1 of this embodiment includes a management unit 11, a transmission unit 12, and a reception unit 13.

The management unit 11 is configured to manage information on EPS (evolved packet system) bearers, U-plane bearers, S1-U bearers, and S1-C bearers for mobile stations UE.

For example, the management unit 11 is configured to manage an EPS bearer context of each mobile station UE, radio setting information on the U-plane bearer (the EPS bearer) for each mobile station UE, and the like.

Moreover, the management unit 11 is configured to manage information on the radio base station eNB#1 such as a TEID (tunnel endpoint identity) and an IP address on the radio base station eNB#1 side.

Furthermore, the management unit 11 is configured to manage information concerning a cell (such as the cell #1) under the control of the radio base station eNB#1, the information including, for example, a PCI (physical cell identity), a used frequency, information related to an AS (access stratum), and the like concerning the relevant cell.

Moreover, the management unit 11 is configured to manage information on the radio base station PhNB#10 such as a TEID and an IP address on the radio base station PhNB#10 side.

Furthermore, the management unit 11 is configured to manage information concerning a cell (such as the cell #10) under the control of the radio base station PhNB#10, the information including, for example, a PCI, a used frequency, AS-related information, and the like concerning the relevant cell.

The transmission unit 12 is configured to transmit various signals to the mobile station UE, the radio base station PhNB#10, the mobility management node MME, and the gateway device S-GW, while the reception unit 13 is configured to receive various signals from the mobile station UE, the radio base station PhNB#10, the mobility management node MME, and the gateway device S-GW.

For example, the transmission unit 12 is configured to transmit "E-RAB Setup Request For eLA" shown in FIG. 5 to the radio base station PhNB#10.

The "E-RAB Setup Request For eLA" is a message used for requesting allocation of resources for one or more S1-U bearers (E-RAB: E-UTRAN radio access bearer).

The transmission unit 12 is configured to notify the radio base station PhNB#10 of the radio setting information on the U-plane bearer (the EPS bearer for the mobile station UE) between the mobile station UE and the radio base station eNB#1 by using an information element "RRCContext" in the "E-RAB Setup Request For eLA."

The radio setting information on the U-plane bearer includes "PDCP config," "RLC config," "MAC conifig," and the like.

Meanwhile, the transmission unit 12 is configured to notify the radio base station PhNB#10 of the IP address on the radio base station eNB#1 side by using an information element "Transport Layer Address" in the "E-RAB Setup Request For eLA," and of the TEID on the radio base station eNB#1 side by using an information element "GTP-TEID" in the "E-RAB Setup Request For eLA."

In the meantime, the reception unit 13 is configured to transmit "E-RAB Setup Response For eLA" shown in FIG. 6 from the radio base station PhNB#10.

The "E-RAB Setup Response For eLA" is a message to report a processing result corresponding to the "E-RAB Setup Request For eLA."

The reception unit 13 is configured to acquire the IP address on the radio base station PhNB#10 side from the radio base station PhNB#10 by using an information element "Transport Layer Address" in the "E-RAB Setup Response For eLA," and to acquire the TEID on the radio base station PhNB#10 side therefrom by using an information element "GTP-TEID" in the "E-RAB Setup Response For eLA."

Meanwhile, the transmission unit 12 is configured to transmit "RRC Connection Reconfiguration" shown in FIG. 7 to the mobile station UE.

The transmission unit 12 is configured to notify the mobile station UE of information which correlates identification information on the EPS bearer with identification information on the cell #10 by using an information element "SmallCellToAddModList-r11" in the "RRC Connection Reconfiguration."

Specifically, as shown in FIG. 7, an information element "SmallCellId" in the information element "SmallCellToAddModList-r11" is configured to notify of the identification information on the cell #10 (PhantomCellId) and the used frequency (ARFCN-ValueEUTRA) thereof.

Meanwhile, as shown in FIG. 7 and FIG. 8, an information element "DRB-ToAddModSmallCell" in an information element "DRB-ToAddModSmallCellList" in an information element "SmallCellRadioResourceConfigDedicated-r11" in the information element "SmallCellToAddModList-r11" is configured to notify of the identification information on the EPS bearer (eps-BearerIdentity).

Operations of the mobile communication system of this embodiment are described below with reference to FIG. 9 and FIG. 10.

First, an operation to add the radio base station PhNB#10 (the cell #10) in the mobile communication system of this embodiment is described with reference to FIG. 9.

Figure 9:
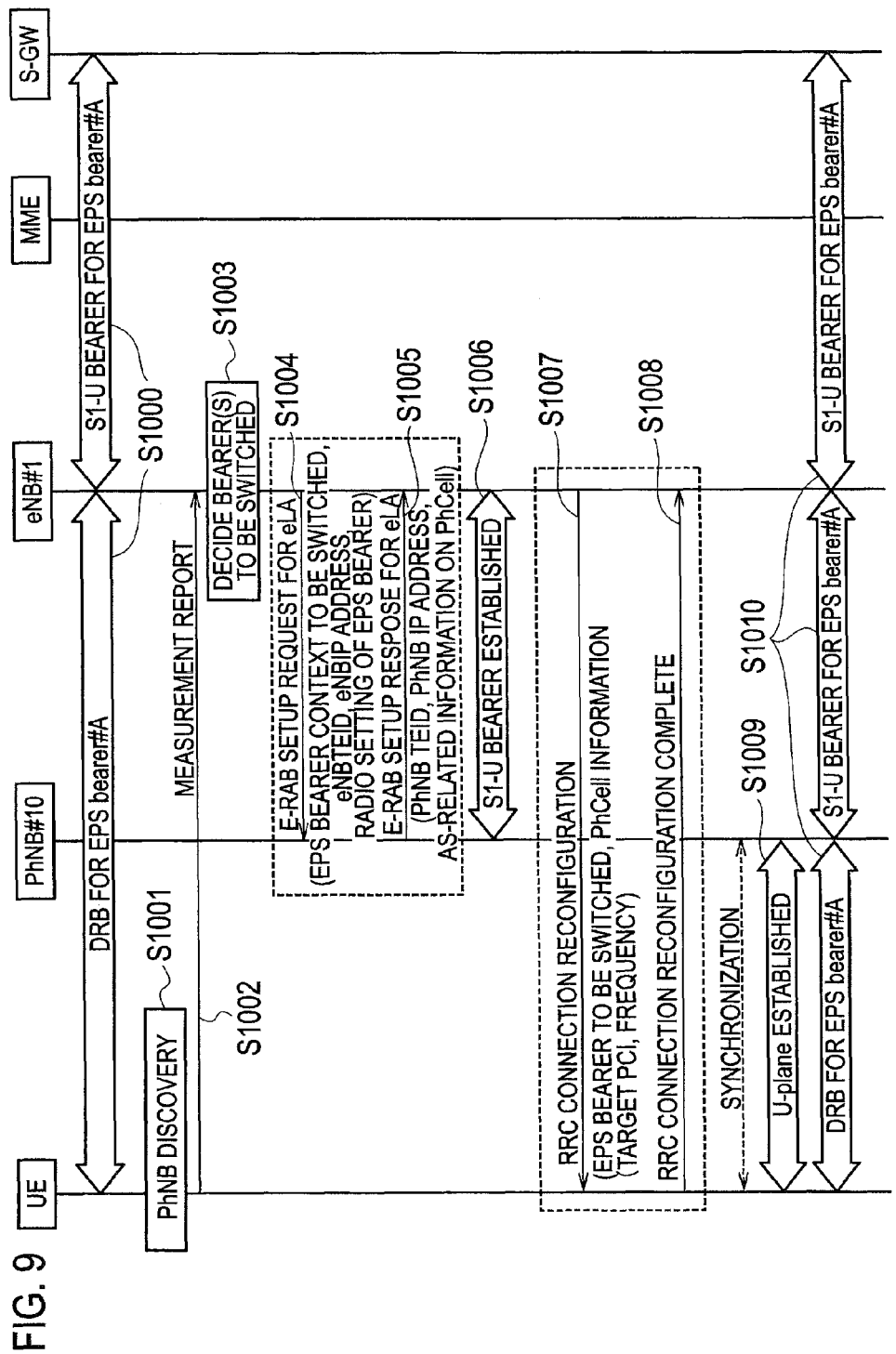
FIG. 9 is a sequence diagram showing an operation of the mobile communication system according to the first embodiment of the present invention.

As shown in FIG. 9, in step S1000, when communication of the mobile station UE in a "RRC_Connected state" in the cell #1 under the control of the radio base station eNB#1 is performed through an EPS bearer #A formed of a U-plane bearer (a DRB) between the mobile station UE and the radio base station eNB#1 and an S1-U bearer between the radio base station eNB#1 and the gateway device S-GW, the mobile station UE detects the radio base station PhNB#10 in step S1001, and sends the radio base station eNB#1 "Measurement Report" containing a measurement result on the radio base station PhNB#10 in step S1002.

In step S1003, the radio base station eNB#1 detects that the radio base station PhNB#10 is located in the coverage area of the cell #1, decides to add the cell #10 under the control of the radio base station PhNB#10 for the mobile station UE, and decides to switch a route of the EPS bearer for the mobile station UE to a route passing through the radio base station PhNB#10. In step S1004, the radio base station eNB#1 transmits the "E-RAB Setup Request For eLA (see FIG. 5)" to the radio base station PhNB#10.

Here, when there are two or more EPS bearers established for the mobile station UE, the radio base station eNB#1 may decide the EPS bearer targeted for the route switching.

In step S1005, the radio base station PhNB#10 sends the radio base station eNB#1 the "E-RAB Setup Response For eLA (see FIG. 6)" in response to the "E-RAB Setup Request For eLA."

By performing the processing in step S1004 and step S1005, it is possible to create a tunnel for the U-plane between the radio base station eNB#1 and the radio base station PhNB#10, and to cause the radio base station PhNB#10 to take over the radio setting information on the U-plane bearer which is set between the mobile station UE and the radio base station eNB#1.

As a result, the setting of the S1-U bearer between the radio base station eNB#1 and the radio base station PhNB#10 is completed in step S1006.

In step S1007, the radio base station eNB#1 sends the mobile station UE the "RRC Connection Reconfiguration (see FIG. 7 and FIG. 8)" which instructs to switch the route of the EPS bearer #A for the mobile station UE to the route passing through the radio base station PhNB#10.

Here, since the radio base station PhNB#10 does not have the RRC layer function, the radio base station eNB#1 notifies the mobile station UE of the information which correlates the identification information on the EPS bearer #A with the identification information on the cell #10 by using the "RRC Connection Reconfiguration," thereby instructing to switch the route of the EPS bearer #A for the mobile station UE to the route passing through the radio base station PhNB#10.

In step S1008, the mobile station UE transmits "RRC Connection Reconfiguration Complete" to the radio base station eNB#1 and establishes synchronization with the radio base station PhNB#10.

As a result, the setting of the U-plane bearer (the DRB) between the mobile station UE and the radio base station PhNB#10 is completed in step S1009. In step S1010, the route of the EPS bearer #A for the mobile station UE is switched from the route not passing through the radio base station PhNB#10 (the gateway device S-GW ←→ the radio base station eNB#1 ←→ the mobile station UE) to the route passing through the radio base station PhNB#10 (the gateway device S-GW ←→ the radio base station eNB#1 ←→ the radio base station PhNB#10 ←→ the mobile station UE).

Second, an operation to remove the radio base station PhNB#10 (the cell #10) in the mobile communication system of this embodiment is described with reference to FIG. 10.

As shown in FIG. 10, in step S2000, when the communication of the mobile station UE in the "RRC_Connected state" in the cell #1 under the control of the radio base station eNB#1 is performed through the EPS bearer #A formed of the U-plane bearer (the DRB) between the mobile station UE and the radio base station PhNB#10, the S1-U bearer between the radio base station PhNB#10 and the radio base station eNB#1, and the S1-U bearer between the radio base station eNB#1 and the gateway device S-GW, the mobile station UE detects a fact that the mobile station UE goes out of the coverage area of the cell #10 under the control of the radio base station PhNB#10 (or deterioration in quality in the cell #10 under the control of the radio base station PhNB#10) in step S2001, and sends the radio base station eNB#1 "Measurement Report" containing a measurement result on the radio base station PhNB#10 in step S2002.

In step S2003, the radio base station eNB#1 decides to remove the cell #10 under the control of the radio base station PhNB#10 from the service for the mobile station UE, and decides to switch the route of the EPS bearer for the mobile station UE to a route not passing through the radio base station PhNB#10. In step S2004, the radio base station eNB#1 sends the radio base station PhNB#10 "E-RAB Release Request" which instructs to release the U-plane bearer between the mobile station UE and the radio base station PhNB#10.

In step S2005, the radio base station PhNB#10 transmits "E-RAB Release Response" to the radio base station eNB#1 in response to the "E-RAB Release Request."

In the processing in step S2004 and step S2005, the radio base station eNB#1 can take over the radio setting information on the U-plane bearer which is set between the mobile station UE and the radio base station PhNB#10.

Then, the S1-U bearer between the radio base station eNB#1 and the radio base station PhNB #10 is also released in step S2006.

In step S2007, the radio base station eNB#1 sends the mobile station US the "RRC Connection Reconfiguration" which instructs to switch the route of the EPS bearer #A for the mobile station UE to the route not passing through the radio base station PhNB#10.

Here, since the radio base station PhNB#10 does not have the RRC layer function, the radio base station eNB#1 notifies the mobile station UE of the information for removing the correlation between the identification information on the EPS bearer #A and the identification information on the cell #10 by using the "RRC Connection Reconfiguration," thereby instructing to switch the route of the EPS bearer #A for the mobile station UE to the route not passing through the radio base station PhNB#10.

In step S2008, the mobile station UE transmits the "RRC Connection Reconfiguration Complete" to the radio base station eNB#1 and establishes the synchronization with the radio base station eNB#1.

As a result, the setting of the U-plane bearer (the DRB) between the mobile station UE and the radio base station eNB#1 is completed in step S2009. In step S2010, the route of the EPS bearer #A for the mobile station UE is switched from the route passing through the radio base station PhNB#10 (the gateway device S-GW ←→ the radio base station eNB#1 ←→ the radio base station PhNB#10 ←→ the mobile station UE) to the route not passing through the radio base station PhNB#10 (the gateway device S-GW ←→ the radio base station eNB#1 ←→ the mobile station UE).

Thereafter, when the cell #10 is removed, the radio base station eNB#1 sends the mobile station UE the "RRC Connection Reconfiguration" containing information on the removal of the correlation between the identification information on the EPS bearer #A and the identification information on the cell #10.

The features of this embodiment may also be expressed as follows.

A first feature of this embodiment is summarized as a mobile communication method including: a step A of, when communication of a mobile station UE in a "RRC_Connected state (connected state)" in a cell #1 (first cell) under control of a radio base station eNB#1 (first radio station) is performed through an EPS bearer (radio access bearer) formed of a U-plane bearer (data radio bearer) between the mobile station UE and the radio base station eNB#1 and an S1-U bearer between the radio base station eNB#1 and a gateway device S-GW, and if a cell #10 (second cell) under control of a radio base station PhNB#10 (second radio base station) is located in a coverage of the cell #1 and the radio base station eNB#1 detects that the cell #10 is located around the mobile station UE from a result of a radio measurement on the mobile station UE, causing the radio base station eNB#1 to send the mobile station UE "RRC Connection Reconfiguration (setting change signal)" containing information correlating identification information on the EPS bearer with identification information on the cell #10; a step B of causing the mobile station UE to set a U-plane bearer between the mobile station UE and the radio base station PhNB#10 in response to the "RRC Connection Reconfiguration"; and a step C of changing the EPS access bearer so that the EPS bearer is formed of the U-plane bearer between the mobile station UE and the radio base station PhNB#10, an S1-U bearer between the radio base station PhNB#10 and the radio base station eNB#1, and the S1-U bearer between the radio base station eNB#1 and the gateway device S-GW.

With this configuration, when the cell #10 is added, the route of the EPS bearer #A for the mobile station UE can be properly switched from the route not passing through the radio base station PhNB#10 (the gateway device S-GW ←→ the radio base station eNB#1 ←→ the mobile station UE) to the route passing through the radio base station PhNB#10 (the gateway device S-GW ←→ the radio base station eNB#1 ←→ the radio base station PhNB#10 ←→ the mobile station UE).

In the first feature of this embodiment, in the step A, the radio base station eNB#1 may notify the radio base station PhNB#10 of radio setting information on the U-plane bearer between the mobile station UE and the radio base station PhNB#10.

With this configuration, when the cell #10 is added, the radio base station PhNB#10 can take over the radio setting information on the U-plane bearer between the mobile station UE and the radio base station eNB#1. Thus, it is possible to safely switch the above-described route of the EPS bearer #A for the mobile station UE and to reduce the time required for the switching.

The mobile communication method in the first feature of this embodiment further may include step D of, when the radio base station eNB#1 removes the cell #10, causing the radio base station eNB#1 to send the mobile station UE "RRC Connection Reconfiguration" containing information to remove a correlation between the identification information on the EPS bearer and the identification information on the cell #10; and a step E of changing the EPS bearer so that the EPS bearer is formed of the U-plane bearer between the mobile station UE and the radio base station eNB#1 and the S1-U bearer between the radio base station eNB#1 and the gateway device S-GW.

With this configuration, when the cell #10 is removed, the route of the EPS bearer #A for the mobile station UE can be properly switched from the route passing through the radio base station PhNB#10 (the gateway device S-GW ←→ the radio base station eNB#1 ←→ the radio base station PhNB#10 ←→ the mobile station UE) to the route not passing through the radio base station PhNB#10 (the gateway device S-GW ←→ the radio base station eNB#1 ←→ the mobile station UE).

In the first feature of this embodiment, in the step E, the radio base station PhNB#10 may notify the radio base station eNB#1 of radio setting information on the U-plane bearer between the mobile station UE and the radio base station PhNB#10.

With this configuration, when the cell #10 is removed, the radio base station eNB#1 can take over the radio setting information on the U-plane bearer between the mobile station UE and the radio base station PhNB#10. Thus, it is possible to safely switch the above-described route of the EPS bearer #A for the mobile station UE and to reduce the time required for the switching.

A second feature of this embodiment is summarized as a mobile station. Here, the mobile station UE is configured such that when the mobile station UE is in a "RRC_Connected state" in a cell #1 under control of a radio station eNB#1 and performs communication through an EPS bearer formed of a U-plane bearer between the mobile station UE and the radio base station eNB#1 and an S1-U bearer between the radio base station eNB#1 and a gateway device S-GW, and if the mobile station UE receives "RRC Connection Reconfiguration" from the radio base station eNB#1, the "RRC Connection Reconfiguration" containing information correlating identification information on the EPS bearer with identification information on a cell #10, the mobile station UE sets a U-plane bearer between the mobile station UE and the radio base station PhNB#10 in response to the "RRC Connection Reconfiguration", and changes the EPS bearer so that the EPS bearer is formed of the U-plane bearer between the mobile station UE and the radio base station PhNB, an S1-U bearer between the radio base station eNB#10 and the radio base station eNB#1, and the S1-U bearer between the radio base station eNB#1 and the gateway device S-GW.

It should be noted that the foregoing operations of the mobile stations UE, the radio base stations PhNB#10/PhNB#10, the mobility management node MME, and the gateway devices S-GW/P-GW may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile stations UE, the radio base stations PhNB#10/PhNB#10, the mobility management node MME, and the gateway devices S-GW/P-GW. Otherwise, the storage medium and the processor may be provided as discrete components inside the mobile stations UE, the radio base stations PhNB#10/PhNB#10, the mobility management node MME, and the gateway devices S-GW/P-GW.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-179812 (filed on Aug. 14, 2012) is incorporated by reference in the present specification.

INDUSTRIAL APPLICABILITY

As described above, the present invention can provide a mobile communication method and a mobile station, which are capable of realizing optimum architecture from the viewpoint of "connectivity" and "mobility" as well as the viewpoint of an increase in system capacity and of load distribution, while minimizing an impact on a core network.

EXPLANATION OF THE REFERENCE NUMERALS eNB#1, PhNB#10 radio base station
11 management unit
12 transmission unit
13 reception unit

The invention claimed is:

1. A mobile communication method comprising:
a step A of, when communication of a mobile station in a connected state in a first cell under control of a first radio base station is performed through an evolved packet system (EPS) bearer,
wherein the EPS bearer is formed of a Data radio bearer between the mobile station and the first radio base station and an S1-U bearer between the first radio base station and a gateway device, and
when a second cell under control of a second radio base station is located in a coverage of the first cell and the first radio base station detects that the second cell is located around the mobile station from a result of a radio measurement on the mobile station, causing the first radio base station to send the mobile station a setting change signal containing information correlating identification information on the EPS bearer with identification information on the second cell;
a step B of causing the mobile station to set a Data radio bearer between the mobile station and the second radio base station in response to the setting change signal; and
a step C of changing the EPS bearer,
wherein the EPS bearer is formed of the Data radio bearer between the mobile station and the second radio base station, an S1-U bearer between the second radio base station and the first radio base station, and the S1-U bearer between the first radio base station and the gateway device.

2. The mobile communication method according to claim 1, wherein,
in the step A, the first radio base station notifies the second radio base station of radio setting information on the Data radio bearer between the mobile station and the first radio base station.

3. The mobile communication method according to claim 1, further comprising:
a step D of, when the first radio base station removes the second cell, causing the first radio base station to send the mobile station a setting change signal containing information to remove a correlation between the identification information on the EPS bearer and the identification information on the second cell; and
a step E of changing the EPS bearer,
wherein the EPS bearer is formed of the Data radio bearer between the mobile station and the first radio base station and the S1-U bearer between the first radio base station and the gateway device.

4. The mobile communication method according to claim 3, wherein,
in the step E, the second radio base station notifies the first radio base station of radio setting information on the Data radio bearer between the mobile station and the second radio base station.

5. A mobile station, comprising:
a receiver; and
a processor,
wherein the processor is configured to:
when the mobile station is in a connected state in a first cell under control of a first radio base station and performs communication through an evolved packet system (EPS) bearer,
wherein the EPS bearer is formed of a Data radio bearer between the mobile station and the first radio base station and an S1-U bearer between the first radio base station and a gateway device, and
when the receiver of the mobile station receives a setting change signal from the first radio base station, the setting change signal containing information correlating identification information on the EPS bearer with identification information on a second cell under control of a second radio base station, the second cell being located in a coverage of the first cell, the processor of the mobile station sets a Data radio bearer between the mobile station and the second radio base station in response to the setting change signal, and changes the EPS bearer,
wherein the EPS bearer is formed of the Data radio bearer between the mobile station and the second radio base station, an S1-U bearer between the second radio base station and the first radio base station, and the S1-U bearer between the first radio base station and the gateway device.

6. The mobile communication method according to claim 2, further comprising:
a step D of, when the first radio base station removes the second cell, causing the first radio base station to send the mobile station a setting change signal containing information to remove a correlation between the identification information on the EPS bearer and the identification information on the second cell; and
a step E of changing the EPS bearer,
wherein the EPS bearer is formed of the Data radio bearer between the mobile station and the first radio base station and the S1-U bearer between the first radio base station and the gateway device.

7. The mobile communication method according to claim 1, further comprising:
a step of causing the first radio base station to send the second radio base station a E-UTRAN radio access bearer (E-RAB) Setup Response for enhanced local area (eLA) that is a message user for requesting allocation of resources for one or more S1-U bearers; and
a step of causing the first radio base station and the second radio base station to set the S1-U bearer in response to the E-RAB Setup Response for eLA.

* * * * *